United States Patent Office 3,631,113
Patented Dec. 28, 1971

3,631,113
2-METHOXY-5-METHYL-m-XYLYLENE DICHLORIDE
Harold Marvin Foster, Park Forest, Ill., assignor to The Sherwin-Williams Company, Cleveland, Ohio
No Drawing. Filed Oct. 13, 1969, Ser. No. 865,945
Int. Cl. C07c *43/28*
U.S. Cl. 260—612 D      1 Claim

ABSTRACT OF THE DISCLOSURE

A novel compound, 2-methoxy-5-methyl-m-xylylene dichloride, is synthesized by reacting 2,6-bis(hydroxymethyl)-4-methylanisole with thionyl chloride. The product is useful in the manufacture of 2,6-bis(alkylthiomethyl)-4-methylanisoles.

DESCRIPTION

This invention relates to a novel organic compound and its method of manufacture. In particular, 2-methoxy-5-methyl-m-xylylene dichloride is made by reacting a precursor with thionyl chloride in the presence of an inert diluent.

The reaction may be represented by the following:

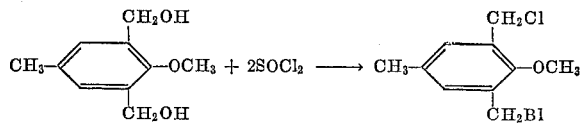

The precursor compound, 2,6-bis(hydroxymethyl)-4-methylanisole, can be made by the method of Ullmann and Brittner described in Ber., 42, 2539 (1909). The product is useful in synthesizing a class of microbiocidal compositions. The synthesis and use of the 2,6-bis (alkylthiomethyl)-4-methylanisoles is disclosed in my copending U.S. patent application Ser. No. 865,981, filed concurrently herewith and entitled "Thiobenzenoid Compounds," the disclosure of which is incorporated herein by reference.

Synthesis

A slurry was made of 120 parts by weight of benzene, 36.4 parts (0.2 mol) of 2,6-bis(hydroxymethyl)-4-methylanisole, ½ part pyridine and, to which was added, at 20–25° C., 52.4 parts (0.44 mol) of thionyl chloride incrementally. The temperature of the reaction mixture rose to about 36° C. during the reaction and gas was evolved. Stirring was continued throughout the addition of thionyl chloride and for half an hour thereafter. Then the mixture was heated for one hour under gentle reflux, cooled and poured into an equal volume of ice water. Two phases formed and were separated into an organic layer and an aqueous layer. The organic (benzene) layer was washed with equal volumes of saturated aqueous $NaHCO_3$ solution, then with water, and dried over anhydrous calcium sulfate. The benzene fraction was clarified and volatile components removed by vacuum distillations. The solid residue, 47.8 parts by weight, was recrystallized from petroleum ether in two crops to yield 39.6 parts of product (90.4% theoretical yield). A sample was further purified by recrystallization from hexane, followed by vacuum sublimation.

Analyses

This layer chromatography indicated a purity of at least 99%. The product, 2-methoxy-5-methyl-m-xylylene dichloride has a melting point of 61–62° C. and the following micronanalysis:

Calculated for $C_{10}H_{12}Cl_2O$ (percent): C, 54.81; H, 5.52; Cl, 32.36. Found (percent): C, 55.16; H, 5.77; Cl, 32.28.

The structural formula was corroborated by infrared and nuclear magnetic resonance spectra.

Use

The novel compound of this invention can be used in the preparation of 2,6-bis(alkylthiomethyl)-4-methylanisole by reacting the precursor with an alkanethiol. For instance, those thiols having the formula $H(CH_2)nSH$, where $n$ is 1 to 12, can be reacted with the dichloride by refluxing in an alcoholic caustic solution. The resulting compounds can be used as microbiocides in the control of yeasts or fungi. These compounds may be applied to the microorganism at a concentration of about 1 percent in an inert carrier such as powder, paste or liquid. Likewise, they may be incorporated into an organic nutrient material such as fabric molding materials or coatings to prevent growth on these materials.

I claim:
1. 2-methoxy-5-methyl-m-xylylene dichloride.

References Cited

UNITED STATES PATENTS 1,887,396   11/1932   Brunner _____ 260—612 D X

OTHER REFERENCES

El'tsov, Chemical Abstracts, vol. 64 (1966) 3439.

BERNARD HELFIN, Primary Examiner

U.S. Cl. X.R.

260—609 F, 999; 424—340